US007356031B1

(12) United States Patent
Toebes et al.

(10) Patent No.: US 7,356,031 B1
(45) Date of Patent: Apr. 8, 2008

(54) INTER-V4 REALM ROUTING

(75) Inventors: John Albert Toebes, Cary, NC (US); Eric Levy-Abegnoli, Nice (FR); Pascal Thubert, La Colle sur Loup (FR)

(73) Assignee: Cisco Technology, Inc., San Jose, CA (US)

( * ) Notice: Subject to any disclaimer, the term of this patent is extended or adjusted under 35 U.S.C. 154(b) by 927 days.

(21) Appl. No.: 10/061,553

(22) Filed: Feb. 1, 2002

(51) Int. Cl.
*H04L 12/57* (2006.01)
(52) U.S. Cl. ...................................... 370/392; 370/401
(58) Field of Classification Search ..................... None
See application file for complete search history.

(56) References Cited

U.S. PATENT DOCUMENTS

| | | | | |
|---|---|---|---|---|
| 5,856,974 | A | * | 1/1999 | Gervais et al. ............. 370/392 |
| 6,026,441 | A | * | 2/2000 | Ronen ........................ 709/227 |
| 6,304,913 | B1 | * | 10/2001 | Rune .......................... 709/241 |
| 6,418,476 | B1 | * | 7/2002 | Luciani ....................... 709/238 |
| 7,013,343 | B2 | * | 3/2006 | Shigezumi .................. 709/232 |
| 2002/0023152 | A1 | * | 2/2002 | Oguchi ....................... 709/223 |
| 2002/0169887 | A1 | * | 11/2002 | MeLampy et al. .......... 709/231 |

OTHER PUBLICATIONS

Postel, "Internet Protocol," Request for Comments 791, Internet Engineering Task Force, Sep. 1981.
Rekhter, et al., "A Border Gateway Protocol 4 (BGP-4)," Request for Comments 1771, Internet Engineering Task Force, Mar. 1995.
R. Gilligan, et al. "Transmission Mechanisms for IPv6 Hosts and Routers," Request for Comments 1933, Internet Engineering Task Force, Apr. 1996.
R. Callon, et al. "Routing Aspects of IPv6 Transition," Request for Comments 2185, Internet Engineering Task Force, Sep. 1997.
A. Conta, et al. "Generic Packet Tunneling in IPv6 Specification," Request for Comments 2473, Internet Engineering Task Force, Dec. 1998.
B. Carpenter, et al. "Transmission of IPv6 over IPv4 Domains Without Explicit Tunnels," Request for Comments 2529, Internet Engineering Task Force, Mar. 1999.
P. Srisuresh, et al. "IP Network Address Translator (NAT) Terminology and Considerations," Request for Comments 2663, Internet Engineering Task Force, Aug. 1999.
Tsirtsis, et al., "Network Address Translation—Protocol Translation (NAT-PT)," Request for Comments 2766, Internet Engineering Task Force, Feb. 2000.
Tsuchiya, et al., Dual Stack Hosts Using the "Bump in the Stack Technique," Request for Comments 2767, Internet Engineering Task Force, Feb. 2000.
M. A. Miller, Implementing IPv6, Second Edition: Supporting the Next Generation Protocols, Ch. 9, pp. 285-310, 2000.

* cited by examiner

*Primary Examiner*—Edan Orgad
*Assistant Examiner*—Jung Park
(74) *Attorney, Agent, or Firm*—Cindy Kaplan (57) ABSTRACT

Packets may be forwarded between realms employing private unregistered addresses without the use of network address translation and/or application level gateways. Nodes within privately addressed realms are identified by a combination of their locally significant address and a globally significant realm address. The globally significant addresses are reserved in all realms for use as realm identifiers or inter-realm routing. To send a packet to a node within a distinct private realm, the packet is given an inner IP header designating the locally significant destination IP address of the target node within the remote realm and an encapsulation IP header indicating the globally significant address advertised by the gateway of the target node's realm. The globally significant address is used for forwarding outside the realm of the destination node. Once the packet reaches the destination realm, the locally significant address is used for forwarding.

23 Claims, 5 Drawing Sheets

INTER-V4 REALM ROUTING

BACKGROUND OF THE INVENTION

The present invention relates to data networking and more particularly to routing and addressing.

In recent years, the Internet has undergone enormous expansion including expansion in a number of interconnected devices. Internet routing techniques generally operate on individual packets. Each packet has a destination address specified by the packet sender and this destination address is used in making forwarding decisions at intermediate nodes between the sender and the destination. In an idealized realization of the Internet, each node would have a globally significant unique IP address for use in specifying the node as a packet destination. However, under the currently prevalent version of the Internet Protocol (IP), version 4, there are in fact a limited number of such addresses. Therefore, many devices have private unregistered addresses that are only usable for routing within an isolated realm. A technique known as Network Address Translation maps IP addresses between such locally significant unregistered locally significant addresses and globally significant registered addresses.

NAT operates on a gateway node between a realm that employs private unregistered addresses and an external realm that uses the globally unique registered addresses. The NAT gateway maps ports on the exterior-facing interface to globally significant addresses within the private realm. This arrangement operates in a relatively straightforward fashion for client-server sessions where clients within the private realm initiate sessions with servers in the global network. Both the address of the NAT gateway and the globally significant address of the server may be obtained by use of conventional domain name service (DNS) techniques.

It is much more difficult, however, for a client in the global network to contact a client or server located in the private address realm because of the need to somehow advertise the locally significant private address, or an equivalent usable in IP routing, outside the private address realm. One way to do this is a one-to-one mapping between interior private addresses and public globally significant addresses, but this defeats the objectives of employing NAT in the first place such as conservation of addresses. One can also map, e.g., a NAT gateway's HTTP port to a particular private address, the SMTP port to another private address, etc. This technique will not accommodate a large number of privately addressed nodes.

A new generation of Internet services requires peer-to-peer, client-to-client and client-to-server interactions that do not fit within the model accommodated by NAT. Consider, for example, Voice-over-IP (VoIP) where to call a voice-equipped node within the private address realm it is necessary to initiate a session with that node from outside the private realm. To solve this problem, one technique is to incorporate application level functionality within the NAT gateway so that the gateway can establish higher-level protocol sessions and forward packets based in part on application layer packet content. This greatly increases the amount of processing that must be done on packets passing through the gateway and also increases the amount of state information that the gateway must store.

What is needed are systems and methods for interoperating between realms employing private unregistered addresses and realms employing globally unique registered addresses while allowing nodes outside the private realm to initiate sessions with nodes inside the private realm.

SUMMARY OF THE INVENTION

By virtue of one embodiment of the present invention, packets may be forwarded between realms employing private unregistered addresses without the use of network address translation and/or application level gateways. Nodes within privately addressed realms are identified by a combination of their locally significant address and a globally significant realm address. The globally significant addresses are reserved in all realms for use as realm identifiers or inter-realm routing. To send a packet to a node within a distinct private realm, the packet is given an inner IP header designating the locally significant destination IP address of the target node within the remote realm and an encapsulation IP header indicating the globally significant address advertised by the gateway of the target node's realm. The globally significant address is used for forwarding outside the realm of the destination node. Once the packet reaches the destination realm, the locally significant address is used for forwarding.

According to a first aspect of the present invention, a method for operating a client node includes: formatting an IP packet to include a globally significant IP address identifying a realm and a locally significant IP address identifying a destination of the IP packet within the realm, and transmitting the IP packet.

According to a second aspect of the present invention, a method for operating a gateway node to handle a received packet includes: extracting a globally significant destination address from a destination address field of the packet and, if the globally significant destination address identifies a realm directly attached to the gateway node, extracting a locally significant destination address from the packet, placing the locally significant destination address in the destination address field, and forwarding the packet to a local destination within the realm.

Further understanding of the nature and advantages of the inventions herein may be realized by reference to the remaining portions of the Specification and the attached drawings.

DESCRIPTION OF SPECIFIC EMBODIMENTS

Network Device for Implementing Present Invention

Figure 1:
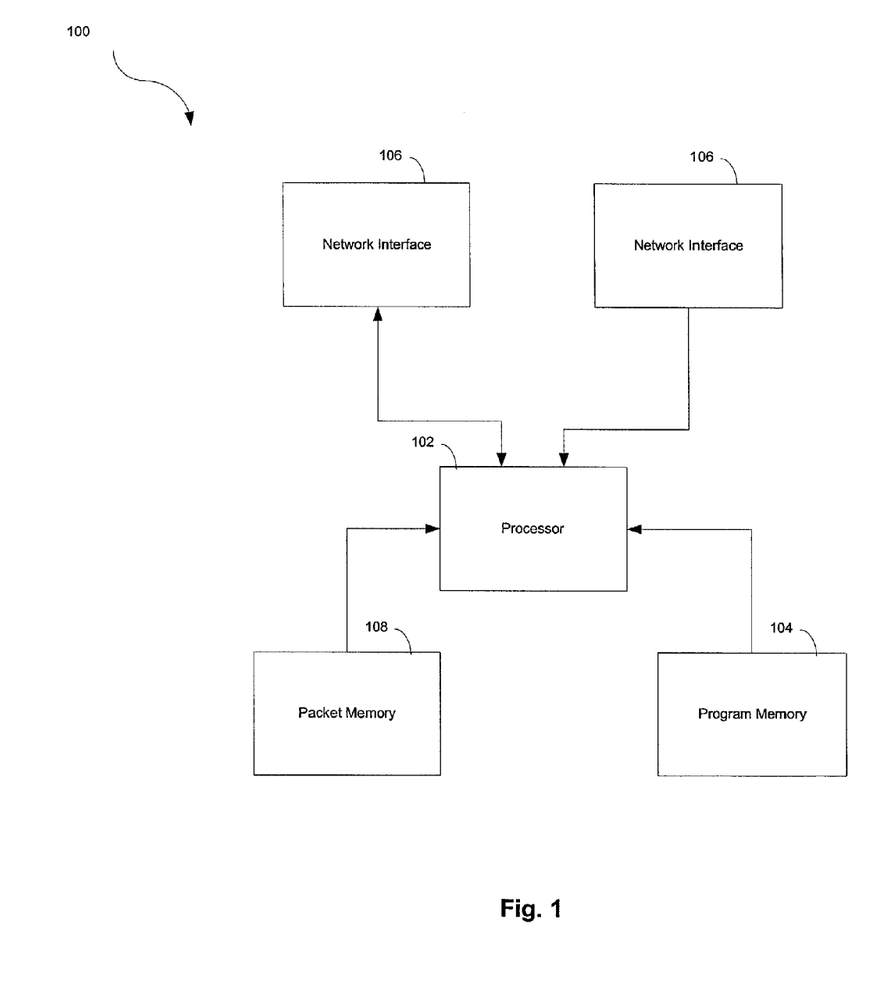
FIG. 1 depicts a network device according to one embodiment of the present invention.

FIG. 1 depicts a network device 100 that may be used to implement a network node operating in accordance with the present invention. In one embodiment, network device 100 is a programmable machine that may be implemented in hardware, software or any combination thereof. A processor 102 executes code stored in a program memory 104. Program memory 104 is one example of a computer-readable storage medium. Program memory 104 can be a volatile memory such as a random access memory (RAM). Another form of computer-readable storage medium storing the same codes would be some type of non-volatile storage such as floppy disks, CD-ROMs, DVD-ROMs, hard disks, flash memory, etc. A carrier wave that carries the code across a network is another example of a computer-readable storage medium.

Network device 100 interfaces with physical media via a plurality (two are depicted) of network interfaces 106. For example, one of network interfaces 106 may couple to an optical fiber and may incorporate an appropriate physical and link layer functionality. Other examples of network interfaces include Ethernet interfaces, DSL interfaces, Gigabit Ethernet interfaces, 10-Gigabit Ethernet interfaces etc. Packets that are received, processed, and forwarded by network device 100 may be temporarily stored in a packet memory 108. Depending on its role, network device 100 implements various network protocols, extensions thereof, and data networking features provided by the present invention as will be explained below.

The description that follows refers to various protocols in use on the Internet as specified by the following documents, all of which are incorporated by reference herein in their entirety for all purposes:

Postel, "Internet Protocol," Request for Comments 791, Internet Engineering Task Force, September 1981.

Rekhter, et al., "A Border Gateway Protocol 4 (BGP-4)," Request for Comments 1771, Internet Engineering Task Force, March 1995.

Tsuchiya, et al., "Dual Stack Hosts Using the "Bump in the Stack Technique," Request for Comments 2767, Internet Engineering Task Force, February 2000

Tsirtsis, et al., "Network Address Translation—Protocol Translation (NAT-PT)," Request for Comments 2766, Internet Engineering Task Force, February 2000.

Global Reachability of IPV4 Addresses

One embodiment of the present invention provides global reachability of IP addresses across the boundaries of IPv4 realms. Like the current public Internet, an IPv4 realm is defined by a full 4-byte address space. Locally significant addresses are defined to be those that are only significant and routable within the boundary of a given realm, and globally significant addresses are defined to be addresses that are reserved in all realms to identify realms or inter-realm routers. With this capability, clients can initiate sessions with clients or servers within other realms such as a privately addressed IPv4 network without the use of network address translation (NAT) or application gateways.

Figure 2:
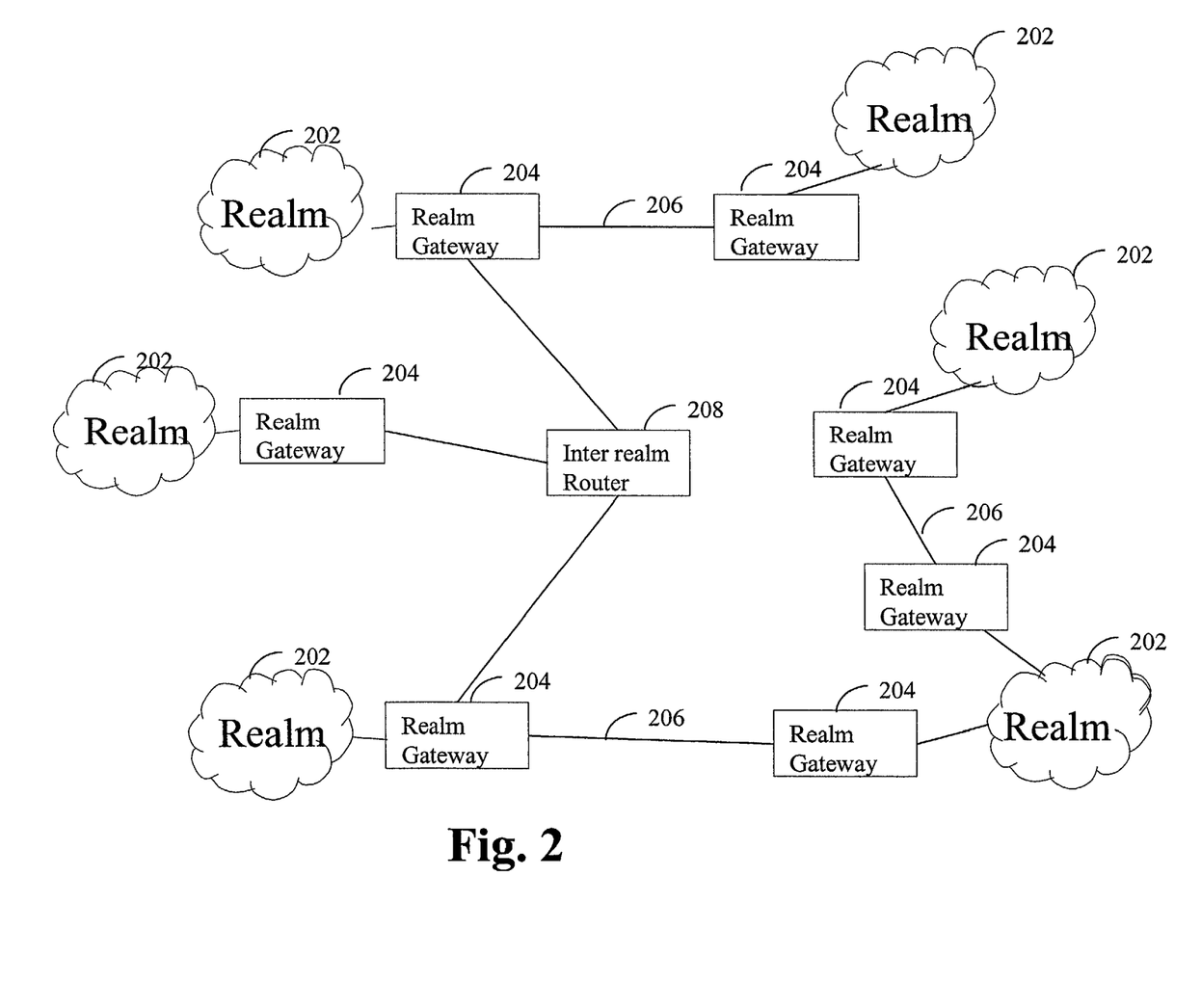
FIG. 2 depicts an arrangement of realms and realm gateways according to one embodiment of the present invention.

In an architecture provided by one embodiment of the present invention, realms are connected to the globally addressed network by realm gateways. FIG. 2 depicts such an architecture. Each of realms 202 incorporates a cloud of network nodes having an IPv4 address unique within that realm but not globally unique. External access to each realm 202 is through one or more realm gateways 204. Realm gateways 204 are interconnected either point-to-point or through peer lines 206 or via inter-realm routers such as depicted inter-realm router 208

Figure 3:
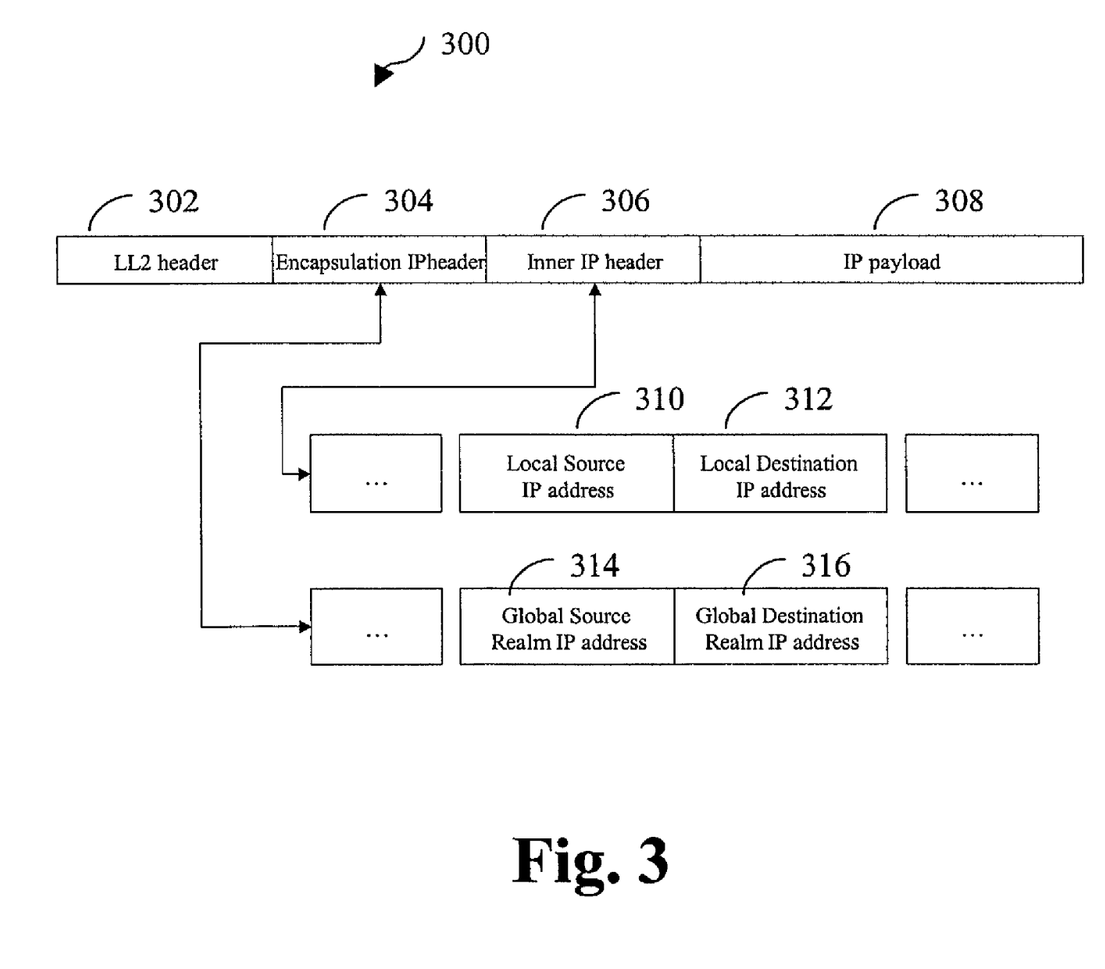
FIG. 3 depicts a packet structure employing both a globally significant IP address and a locally significant IP address according to one embodiment of the present invention.

Each realm has a globally significant IPv4 address. Routers such as inter-realm router 208 that interconnect realm gateways 204 may also be attributed globally significant addresses. The globally significant IPv4 address is preferably in a predefined range globally allocated for realm addresses. This range is reserved in all realms and cannot be used for locally significant addresses. Each node within one of realms 202 has a globally unique IP address that consists of a concatenation of its realm's globally significant IPv4 address and its own locally unique IPv4 address. FIG. 3 depicts a packet structure according to one embodiment of the present invention. A packet 300 includes an LL2 header 302 that includes link layer protocol information, an encapsulation IP header 304, an inner IP header 306, and an IP payload 308.

Details of encapsulation IP header 304 include a global source realm IP address 314 identifying the realm that sources the packet and a global destination realm IP address 316 identifying the realm of the packet's destination. Further contents of encapsulation IP header 304 may be specified by the GRE protocol as known in the art. Inner IP header 306 includes a local source IP address 310 giving the local IPv4 address of the packet source and local destination IP address 312 giving the local address of the packet destination. For both the destination and the source, the combination of local and realm addresses represents a "fully qualified" address.

Only one of the two destination address fields is used for forwarding at a time depending on the location of packet 300. Prior to reaching the destination realm, the global destination realm IP address 316 is used for forwarding decisions. Realm gateways 204 advertise, using BGP-4, for example, the globally significant addresses of the realms to which they are attached and the other realms that may be reached through them. The use of the global destination realm IP address 316 thus has the beneficial effect of aggregating traffic destined for the identified realm. Once the destination realm is reached, the local destination IP address field 312 is used for routing instead.

As a special case within this scheme, the current or "legacy" IPv4 address space will also be represented in two-part form. A specific global realm address is allocated to specify legacy IPv4 global addresses. The composite address of a node that has been previously allocated a globally significant address would include this specified global realm address and the legacy IPv4 address as the local address.

It will be appreciated that the concept that has been described is readily extendible to three or more levels of address hierarchy. For example, a packet may include a first header with global IP addresses, a second header with realm IP addresses significant only within a given realm, and a third header with sub-realm IP addresses significant only within a sub-realm.

Returning now to the discussion of the two-level address hierarchy illustrated in FIGS. 2-3, implementation preferably involves modifications at both gateways 204 and at nodes within realms 202. These modifications include modifications to the operation of applications operating at the client nodes, modifications to packet handling at the application gateway, and modifications to the processes of resolving names to IP addresses. Modifications within the inter-realm gateways are not necessary. These can continue to operate in accordance with standard IPv4 techniques.

Name Resolution

In one embodiment, an extension to the well-known DNS protocol is used to provide host names that may be resolved to the two-part addresses described above. This may be accomplished through a syntactical change to the DNS naming convention. For example, each realm may bear a worldwide, cross-realm, unique name in the form REALM-NAME. Each node within such a realm may have a name in the form LOCAL-DNS@REALMNAME. A client outside the realm seeking to resolve a name in the form LOCALDNS@REALMNAME will first send a request to its global DNS server requesting a record for REALM-NAME. What will be returned will be a globally significant IP address for REALMNAME plus an address for a DNS server. The DNS server address will typically be a locally significant IPv4 address for the DNS server within the target realm. Using both addresses, the client contacts this latter DNS server to resolve LOCAL-DNS to a locally significant address. With the locally significant address and the globally significant realm address, the client has the information to populate the destination fields of packet 300.

The present invention is not, however, limited to DNS resolution techniques. For example, for voice over IP (VoIP) applications, SIP may be used to resolve a single phone number to a combination of globally significant realm address and locally significant node address. In this case, an SIP server would be contacted to obtain address information.

Client Node Operation

Figure 4:
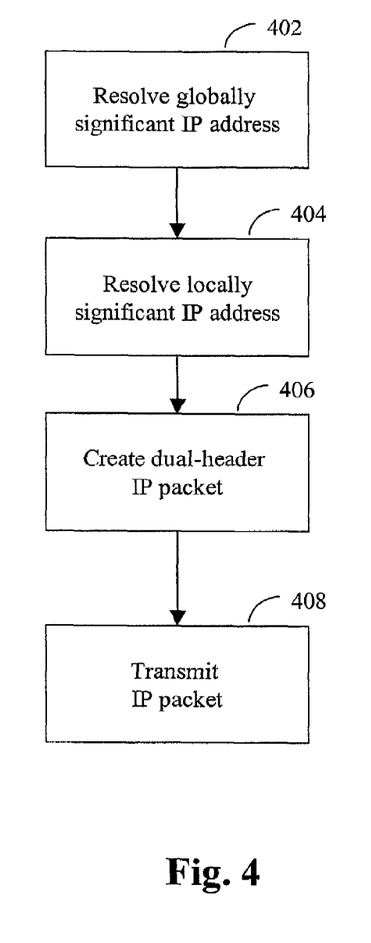
FIG. 4 is a flowchart describing steps of operating a client node according to one embodiment of the present invention.

FIG. 4 is a flowchart describing steps of operating a client node to generate and transmit a packet according to one embodiment of the present invention. The steps of FIG. 4 are particularly relevant to the case of using the client node to initiate a session with a remote node within a remote realm. At a step 402, the client node resolves a destination name to a globally significant realm IP address as described above or by some other technique. At a step 404, the client node resolves the destination name to a locally significant IP address as described above or by some other technique. In some implementations, these steps are essentially performed together. These resolution steps need not be repeated for successive transmissions to the same node.

At a step 406, the client forms a packet in the form illustrated in FIG. 3. The client is aware of its realm address and of course of its locally significant address. These are used to fill in the local source address 310 and global source realm IP address 314. The local destination IP address 312 is obtained from the result of step 404. The globally significant destination realm IP address is obtained from the result of step 402. The packet is transmitted at step 408.

To facilitate implementation, the socket interface is extended to accommodate both the globally significant realm address and the locally significant address. If the remote node initiates the session, the remote node's globally significant address and locally significant address are learnt from the incoming packets.

It should be noted that when the source realm and the destination realm are the same, there is no need to use the encapsulation format of FIG. 3 or any modification to the conventional IPv4 operation. As a consequence, legacy IPv4 devices can still communicate within the boundaries of their own realm with other legacy systems as well as with systems implementing this invention.

The above-described steps of FIG. 4 represent a change to conventional IPv4 operation. In one embodiment, individual applications such as web browsers, e-mail programs, VoIP clients, etc. are modified to implement the DNS operations and the encapsulation. These applications are aware of both the client's locally significant address and the client's globally significant realm address.

Alternatively, the client is not modified but a thin layer is implemented at the client node or at a gateway to effectively translate between the prior art IPv4 address scheme and the extended scheme of the present invention. For example, one may adapt a solution already developed for IPv6, such as, e.g., Bump-In-The-Stack, and NAT-PT, as disclosed in the Request for Comment documents cited above. The socket is aware of the client's globally significant realm address even if the client application is not. The socket intercepts DNS or other name service requests from the client application and obtains the necessary address information in accordance with steps 402 and 404. Only the locally significant IPv4 address, or a forged IP address used as a correlator, is returned to the application for use in generating packets. When the socket receives a packet from the application with this address, it uses this address as an identifier to retrieve the full destination address information for the session including the globally significant destination address. The socket generates and transmits the packet to the destination in accordance with the full destination address information. Similarly, received packets of the session are stripped of their globally significant address information before being sent to the client application.

The socket is also capable of acting on behalf of a remote node to establish a new session with the application. The application receives only the locally significant IPv4 address information for use in sending packets to the remote node. Again, the socket uses this address as a reference to the full address of the remote node.

Routing through Intermediate Nodes

Routing from the originating node to a realm gateway attached to the destination's realm proceeds in accordance with the IP routing protocols operative at intermediate nodes. Forwarding decisions are based on global destination realm IP address 316. Realm gateways 204 advertise their access to realms 202 using, e.g., BGP-4. A realm may have more than one gateway that advertises access to that realm.

Figure 5:
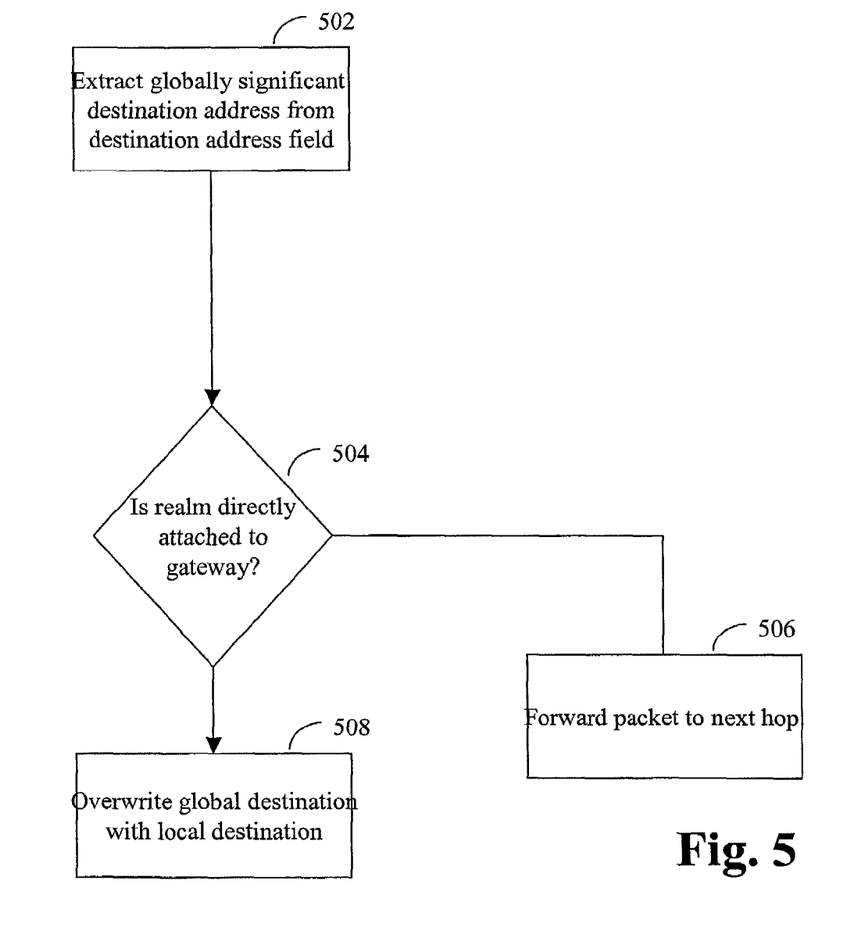
FIG. 5 is a flowchart describing steps of operating a realm gateway node according to one embodiment of the present invention.

The operation of realm gateways 204 is modified to facilitate the handling of packet 300. FIG. 5 is a flowchart describing steps of handling a received packet at a realm gateway according to one embodiment of the present invention. At step 502, the globally significant destination realm IP address 316 is extracted. At step 504, this extracted address is tested to compare it to the realm address of the realm attached to the gateway. If the packet is not addressed to the gateway's attached realm, it is forwarded in a conventional manner at step 506 with the globally significant destination address being used as a key to a forwarding table to select a next hop.

If step 504 determines that the packet is in fact addressed to the gateway's attached realm, then processing proceeds to step 508. At step 508, the global destination address 316 is replaced by the local destination address 312. The locally significant destination IP address is then used as the key to a forwarding table to select a next hop into the attached realm. The packet is then forwarded to this next hop. Further forwarding within the destination realm is based on the locally significant IP address.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. In a data communication network, a method for operating a client node, said method comprising:

formatting an IP packet to include a header comprising a globally significant IP address identifying a realm and a locally significant IP address identifying a destination of said IP packet within said realm;

selecting one of said globally significant IP address and said locally significant IP address for use in forwarding said packet based on a location within the network; and transmitting said IP packet using said selected address from said packet;

wherein said globally significant IP address and said locally significant IP address are both configured for use in forwarding said packet without address translation; and wherein said header comprises an encapsulation IP header and an inner IP header, said encapsulation IP header comprising said globally significant IP address identifying said realm and a globally significant IP address identifying a realm of the client node.

2. The method of claim 1 further comprising:

resolving said globally significant IP address from a first component of a globally significant name; and resolving said locally significant IP address from a second component of a locally significant name.

3. The method of claim 2 wherein resolving said globally significant IP address comprises contacting a global DNS server.

4. The method of claim 2 wherein resolving said globally significant IP address comprises contacting a local DNS server.

5. The method of claim 2 wherein resolving said globally significant IP address comprises contacting an SIP server.

6. The method of claim 1 wherein said globally significant IP address belongs to a range specified for realms.

7. The method of claim 1 wherein the client node comprises a globally unique IP address.

8. The method of claim 7 wherein said globally unique IP address comprises a concatenation of a globally significant IP address of the client node's realm and the client's node locally unique address.

9. The method of claim 1 wherein transmitting said IP packet comprises utilizing only said globally significant IP address in selecting a next hop node.

10. In a data communication network, a computer program product for operating an IP stack at a client node, said computer program product comprising:

code that formats an IP packet to include a header comprising a globally significant IP address identifying a realm and a locally significant IP address identifying a destination of said IP packet within said realm;

code that selects one of said globally significant IP address and said locally significant IP address for use in forwarding said packet based on a location within the network;

code that transmits said IP packet using said selected address from said packet; and a computer-readable storage medium that stores the codes;

wherein said globally significant IP address and said locally significant IP address are both configured for use in forwarding said packet without address translation; and wherein said header comprises an encapsulation IP header and an inner IP header, said encapsulation IP header comprising said globally significant IP address identifying said realm and a globally significant IP address identifying a realm of the client node.

11. The computer program product of claim 10 further comprising:

code that resolves said globally significant IP address from a first component of a globally significant name; and code that resolves said locally significant IP address from a second component of a locally significant name.

12. The computer program product of claim 11 wherein said code that resolves said globally significant IP address comprises code that contacts a global DNS server.

13. The computer program product of claim 11 wherein said code that resolves said globally significant IP address comprises code that contacts a local DNS server.

14. The computer program product of claim 11 wherein said code that resolves said globally significant IP address comprises code that contacts an SIP server.

15. The computer program product of claim 10 wherein said globally significant IP address belongs to a range specified for realms.

16. In a data communication network, apparatus for operating an IP stack at a client node, said apparatus comprising:

a processor; and a memory storing instructions executed by said processor, said instructions comprising:

code that formats an IP packet to include a header comprising a globally significant IP address identifying a realm and a locally significant IP address identifying a destination of said IP packet within said realm;

code that selects one of said globally significant IP address and said locally significant IP address for use in forwarding said packet based on a location within the network; and code that transmits said IP packet using said selected address from said packet;

wherein said globally significant IP address and said locally significant IP address are both configured for use in forwarding said packet without address translation; and wherein said header comprises an encapsulation IP header and an inner IP header, said encapsulation IP header comprising said globally significant IP address identifying said realm and a globally significant IP address identifying a realm of the client node.

17. The apparatus of claim 16 wherein said instructions further comprise:

code that resolves said globally significant IP address from a first component of a globally significant name; and code that resolves said locally significant IP address from a second component of a locally significant name.

18. The apparatus of claim 17 wherein said code that resolves said globally significant IP address comprises code that contacts a global DNS server.

19. The apparatus of claim 17 wherein said code that resolves said globally significant IP address comprises code that contacts a local DNS server.

20. The apparatus of claim 17 wherein said code that resolves said globally significant IP address comprises code that contacts an SIP server.

21. The apparatus of claim 16 wherein said globally significant IP address belongs to a range specified for realms.

22. In a data communication network, apparatus for operating a client node, said apparatus comprising:

means for formatting an IP packet to include a header comprising a globally significant IP address identifying a realm and a locally significant IP address identifying a destination of said IP packet within said realm;

means for selecting one of said globally significant IP address and said locally significant IP address for use in forwarding said packet based on a location within the network; and means for transmitting said IP packet using said selected address from said packet;

wherein said globally significant IP address and said locally significant IP address are both configured for use in forwarding said packet without address translation; and wherein said header comprises an encapsulation IP header and an inner IP header, said encapsulation IP header comprising said globally significant IP address identifying said realm and a globally significant IP address identifying a realm of the client node.

23. In a data communication network, a method for operating a client node, said method comprising:

formatting an IP packet to include a header comprising a globally significant IP address identifying a realm and a locally significant IP address identifying a destination of said IP packet within said realm;

selecting one of said globally significant IP address and said locally significant IP address for use in forwarding said packet based on a location within the network; and transmitting said IP packet using said selected address from said packet;

wherein said globally significant IP address and said locally significant IP address are both configured for use in forwarding said packet without address translation; and wherein said header comprises an encapsulation IP header and an inner IP header said inner IP header said locally significant IP address identifying the destination of said IP packet and a locally significant IP address identifying the client node.

* * * * *